US008430076B2

(12) United States Patent
Kono et al.

(10) Patent No.: US 8,430,076 B2
(45) Date of Patent: Apr. 30, 2013

(54) ENGINE

(75) Inventors: Shohei Kono, Wako (JP); Manabu Hashimoto, Wako (JP); Souhei Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 977 days.

(21) Appl. No.: 11/919,658

(22) PCT Filed: Jun. 23, 2006

(86) PCT No.: PCT/JP2006/312608

§ 371 (c)(1),
(2), (4) Date: Oct. 31, 2007

(87) PCT Pub. No.: WO2006/137519

PCT Pub. Date: Dec. 28, 2006

(65) Prior Publication Data

US 2010/0071646 A1 Mar. 25, 2010

(30) Foreign Application Priority Data

Jun. 23, 2005 (JP) ................................ 2005-183595
Jun. 23, 2005 (JP) ................................ 2005-183607

(51) Int. Cl.
*F02B 67/06* (2006.01)
*F16M 1/026* (2006.01)

(52) U.S. Cl.
USPC .................................... 123/193.5; 123/90.27

(58) Field of Classification Search ............... 123/193.5, 123/19.3, 198 E, 195 C, 19, 90.27–90.4
See application file for complete search history.

(56) References Cited

U.S. PATENT DOCUMENTS

| | | | | |
|---|---|---|---|---|
| 1,415,167 | A * | 5/1922 | Fuchs | 123/90.27 |
| 3,400,956 | A | 9/1968 | Buchwald | |
| 4,662,323 | A * | 5/1987 | Moriya | 123/90.23 |
| 4,819,591 | A * | 4/1989 | Valentine | 123/90.44 |
| 5,343,837 | A * | 9/1994 | Ward et al. | 123/193.5 |
| 5,495,776 | A | 3/1996 | Allen | |
| 5,934,235 | A * | 8/1999 | Astner et al. | 123/90.38 |
| 6,722,221 | B2 | 4/2004 | Maxwell | |

FOREIGN PATENT DOCUMENTS

| | | |
|---|---|---|
| EP | 1 477 635 A | 11/2004 |
| JP | 1-102407 U | 7/1989 |
| JP | 5-14567 | 2/1993 |
| JP | 6-330712 | 11/1994 |
| JP | 10-54296 | 2/1998 |
| JP | 2001-355512 | 12/2001 |

* cited by examiner

*Primary Examiner* — M. McMahon
(74) *Attorney, Agent, or Firm* — Arent Fox LLP

(57) ABSTRACT

An engine includes: a crankshaft 12; a camshaft 36; and a timing transmission system 37 which has a drive rotation member 45, a driven rotation member 46, and an endless power transmission member 47, and which provides connection between the crankshaft 12 and the camshaft 36. An access window 55 through which the driven rotation member 46 is attached to and detached from the camshaft 36 is opened in an outer end surface 5*c* of the cylinder head 5. A lid body 57 for closing the access window 55 is jointed to the outer end surface 5*c*. The outer end surface 5*c* of the cylinder head 5 comprises a slanted surface 5*c* which is inclined so that at least a part of an outer periphery of the driven rotation member 46 on a side opposite from the drive rotation member 45 is exposed from the access window 55. Thus, it is possible to facilitate the operation of attaching the endless power transmission member to the driven rotation member and mounting the driven rotation member to the camshaft, and also contributing to downsizing of the engine.

14 Claims, 12 Drawing Sheets

ENGINE

CROSS-REFERENCE TO RELATED APPLICATION

This application is a National Stage entry of International Application No. PCT/JP2006/312608, filed Jun. 23, 2006, the entire specification claims and drawings of which are incorporated herewith by reference.

TECHNICAL FIELD

The present invention relates to an improvement of an engine comprising: a crankshaft supported on a crankcase; a valve-operating camshaft supported on a cylinder head; and a timing transmission system which includes a drive rotation member fixedly mounted to the crankshaft, a driven rotation member fixedly mounted to the camshaft, and an endless power transmission member wound around the two rotation members, and which provides connection between the crankshaft and the valve-operating camshaft; an access window through which the driven rotation member is attached to and detached from the camshaft being opened in an outer end surface of the cylinder head, and a lid body for closing the access window being jointed to the outer end surface of the cylinder head.

BACKGROUND ART

Such an engine has already been known as disclosed in Patent Publication 1.

Patent Publication 1: Japanese Patent Application Laid-Open No. 10-54296.

DISCLOSURE OF THE INVENTION

Problems to be Solved by the Invention

In the conventional engines as disclosed in Patent Publication 1, a cylinder head is formed so that an outer end surface of the cylinder head in which the access window opens is present outward in the axial direction of the driven rotation member, and hence the driven rotation member is disposed deeply inside the access window. Therefore, the operation of attaching the endless rotation member to the driven rotation member and mounting the driven rotation member to the camshaft is obstructed by the cylinder head around the driven rotation member, thus deteriorating the operability. Further, the entirety of the lid body joined to the outer end surface of the cylinder head is inevitably spaced largely away from the driven rotation member in the axial direction, thus hindering downsizing of the engine.

The present invention has been achieved in view of such circumstances, and has an object to provide a compact engine exhibiting a good operability in attaching an endless rotation member to a driven rotation member and in mounting the driven rotation member to a camshaft.

The present invention has another object to easily and reliably establish a predetermined phase relationship between the crankshaft and the camshaft when a timing transmission system is assembled to the crankshaft and the camshaft, in the case where the camshaft is mounted beforehand on an engine main body.

Means for Solving the Problems

In order to achieve the above objects, according to a first feature of the present invention, there is provided an engine comprising: a crankshaft supported on a crankcase; a valve-operating camshaft supported on a cylinder head; and a timing transmission system which includes a drive rotation member fixedly mounted to the crankshaft, a driven rotation member fixedly mounted to the camshaft; and an endless power transmission member wound around the two rotation members, and which provides connection between the crankshaft and the valve-operating camshaft; an access window through which the driven rotation member is attached to and detached from the camshaft being opened in an outer end surface of the cylinder head, and a lid body for closing the access window being jointed to the outer end surface of the cylinder head, characterized in that the outer end surface of the cylinder head comprises a slanted surface which is inclined so that at least a part of an outer periphery of the driven rotation member on a side opposite from the drive rotation member is exposed from the access window.

According to a second feature of the present invention, in addition to the first feature, the slanted surface is formed so that a half-round portion or more of the driven rotation member on the side opposite from the drive rotation member is exposed from the access window.

According to a third feature of the present invention, in addition to the first or second feature, the cylinder head is superposed, via a gasket, on a cylinder block which is connected to the crankcase and which includes a cylinder bore and a timing transmission chamber that is present on one side of the cylinder bore and houses the timing transmission system; the cylinder head is fastened to the cylinder block by a plurality of main connecting bolts arranged around the cylinder bore; and the cylinder head is fastened to the cylinder block at a portion outward of one side of the timing transmission chamber by an auxiliary connecting bolt disposed below the access window.

According to a fourth feature of the present invention, in addition to the first or second feature, a side wall of the lid body is inclined along the slanted surface of the cylinder head.

According to a fifth feature of the present invention, in addition to any of the first to fourth features, the engine further comprises: a first match mark indicated on an outer side surface of the driven rotation member; a second match mark indicated on an engine main body so as to coincide with the first match mark when the crankshaft is in a predetermined rotational position; a bolt hole provided in an end wall of a hub of the driven rotation member which is fitted into an end portion of the camshaft; a positioning groove extending radially from the bolt hole; a positioning pin projectingly provided on an end surface of the camshaft in a position eccentric from a center of the end surface in a certain direction, and engaged with the positioning groove when the camshaft is in a predetermined phase relationship to the crankshaft in the predetermined rotational position; a threaded hole which is provided on the end surface of the camshaft and corresponds to the bolt hole when the camshaft is in a predetermined phase relationship to the crankshaft in the predetermined rotational position; and a mounting bolt penetrating through the bolt hole and screwed into the threaded hole to fix the hub to the camshaft.

According to a sixth feature of the present invention, in addition to the fifth feature, when the camshaft is in a predetermined phase relationship to the crankshaft in the predetermined rotational position, the first and second match marks, the positioning groove and the positioning pin are arranged on a straight line passing through centers of the crankshaft and the camshaft.

According to a seventh feature of the present invention, in addition to the sixth feature, that the bolt hole and the threaded hole are arranged in positions eccentric from centers of the hub and the camshaft, respectively.

According to an eighth feature of the present invention, in addition to the seventh feature, that the threaded hole and the positioning pin are arranged in positions which are eccentric from the center of the camshaft in directions opposite from each other.

The drive rotation member, the driven rotation member and the endless transmission device correspond respectively to a driving pulley 45, a driven pulley 46 and a timing belt 47 in an embodiment of the present invention which will be described later.

Effects of the Invention

With the first feature of the present invention, a part of the driven pulley exposed to outside the access window can be easily held by a tool or the like without being obstructed by the cylinder head. Therefore, the operation of mounting the driven pulley to the camshaft is facilitated, and also the removal thereof is facilitated. Therefore, this arrangement can contribute to an improvement in assemblability and maintainability.

With the second feature of the present invention, the operation of attaching and detaching of the driven pulley to and from the camshaft is further facilitated, and hence the assemblability and maintainability is further improved.

With the third feature of the present invention, also at a portion around the timing transmission chamber, the surface pressures of the cylinder block and the cylinder head acting on the gasket is sufficiently increased by securing the cylinder head to the cylinder block by the main connecting bolts and the auxiliary connecting bolt. Further, the presence of the slanted surface above the auxiliary connecting bolt provides a space sufficient for accepting a tool for operating the auxiliary connecting bolt, thereby facilitating the operation of fastening the auxiliary connecting bolt and contributing to downsizing of the engine.

With the fourth feature of the present invention, the engine case obtains a head portion whose width is narrowing toward its tip end, thereby contributing to downsizing of the engine.

With the fifth feature of the present invention, the first and second match marks, the bolt hole, the threaded hole, the positioning groove, and the positioning pin can be arranged all together on a straight line passing through the centers of the crankshaft and the camshaft, by sequentially performing the steps of: fixing the crankshaft in a rotational position corresponding to a specified position of the piston; inserting the driven rotation member into the endless power transmission member already wound around the drive rotation member, while aligning the first match mark of the driven rotation member with the second match mark of the engine main body; fitting the positioning pin of the camshaft into the bolt hole of the driven rotation member; and guiding the positioning pin to the positioning groove of the driven rotation member. Therefore, advantageously in this state where the crankshaft and the camshaft have been mounted beforehand to the engine main body, if the mounting bolt is screwed into the threaded hole of the camshaft through the bolt hole of the driven rotation member and fastened, the timing transmission system can be easily and appropriately attached to the crankshaft and the camshaft in their predetermined phase relationship.

With the sixth feature of the present invention, by visually observing the state where the first and second match marks, the positioning groove, and the positioning pin are arranged on the straight line passing through the centers of the crankshaft and the camshaft, it can be easily confirmed that the crankshaft and the cam shaft have established the predetermined phase relationship therebetween.

With the seventh feature of the present invention, the rotation of the driven rotation member is reliably transmitted to the camshaft via the single eccentric mounting bolt, and the mounting bolt is prevented from being loosened.

With the eighth feature of the present invention, it is possible to give a sufficient amount of eccentricity to each of the bolt hole and the positioning groove which are formed on the narrow end wall of the hub of the driven rotation member, thereby improving the positioning effect of the positioning groove on the positioning pin and increasing the torque capacity of the mounting bolt.

The above-mentioned object, other objects, characteristics, and advantages of the present invention will become apparent from a preferred embodiment which will be described in detail below by reference to the attached drawings.

EXPLANATION OF REFERENCE NUMERALS AND SYMBOLS

Figure 1:
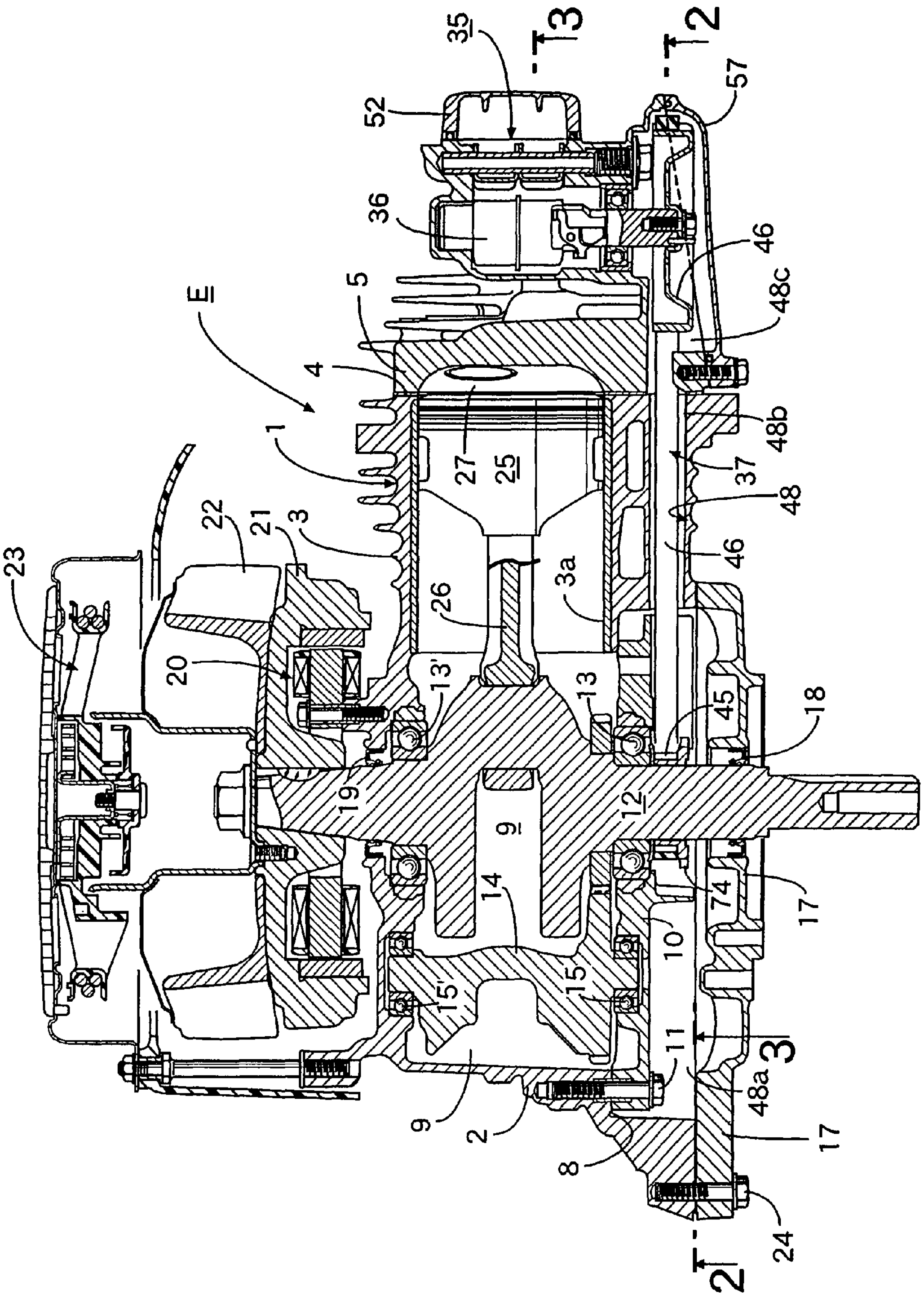
FIG. 1 is a sectional plan view of a general-purpose four-cycle engine according to the present invention. (first embodiment)
Figure 2:
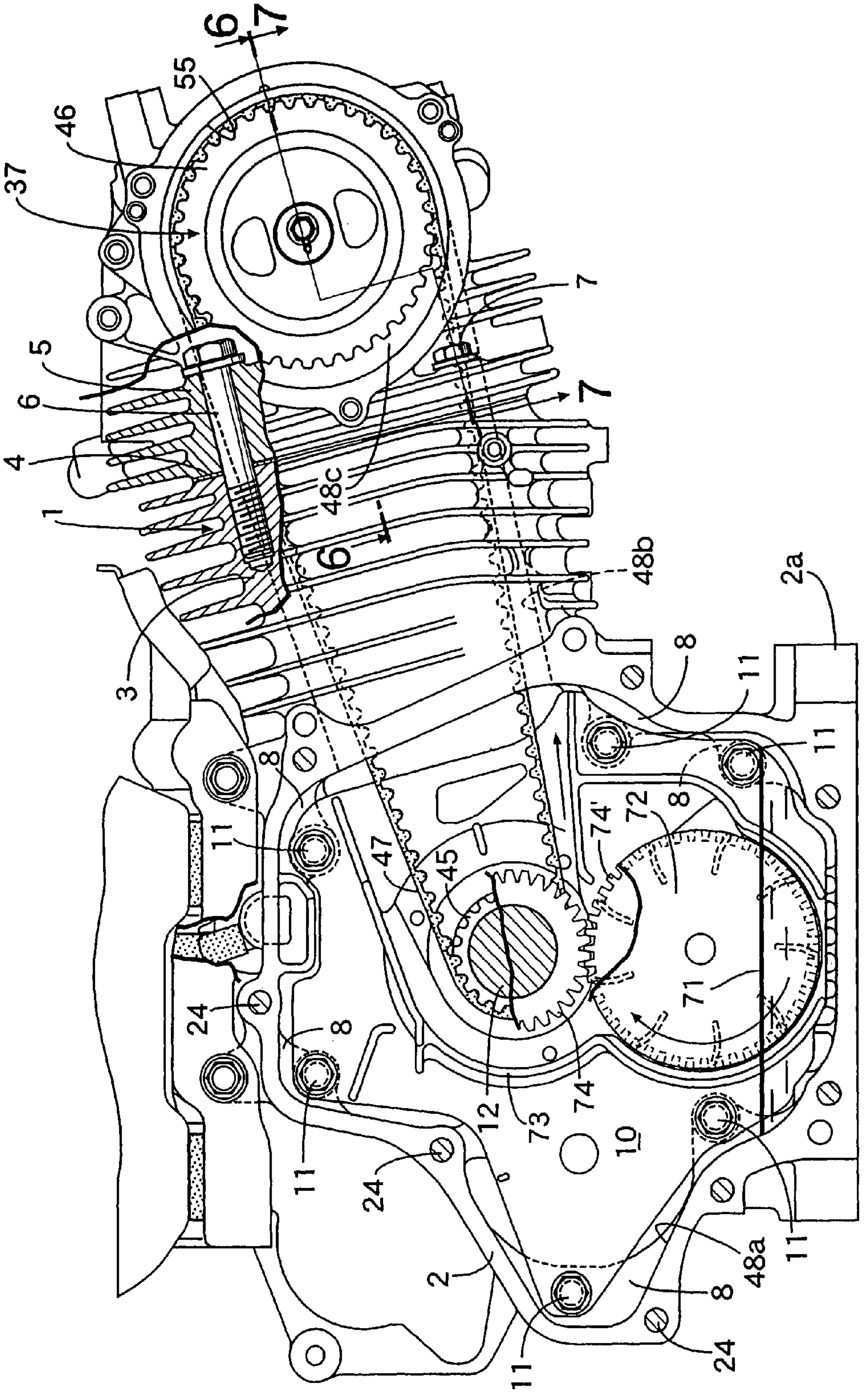
FIG. 2 is a sectional view along line 2-2 in FIG. 1. (first embodiment)

E engine
1 engine main body
3 cylinder block
3*a* cylinder bore
4 gasket
5 cylinder head
5*c* outer end face=inclined face
6 main connecting bolt
7 auxiliary connecting bolt
12 crankshaft
35 valve operating system
36 camshaft
37 timing transmission system
45 drive rotation member (drive pulley)
46 driven rotation member (driven pulley)
46*a* hub
47 endless power transmission member (timing belt)

48 timing transmission chamber
48*a* lower chamber
48*b* middle chamber
48*c* upper chamber
55 access window
57 lid body
60 bolt hole
61 positioning groove
62*a* first match mark
62*b* second match mark
66 threaded hole
67 positioning pin
68 mounting bolt

BEST MODE FOR CARRYING OUT THE INVENTION

A preferred embodiment of the present invention is explained below with reference to the accompanying drawings.

Embodiment 1

Referring first to FIG. 1 to FIG. 4, an engine main body 1 of a general-purpose four-cycle engine E includes: as components a crankcase 2 having on its lower part a mounting seat 2*a*; a cylinder block 3 connected integrally to the crankcase 2 and having an upwardly inclined cylinder bore 3*a*; and a cylinder head 5 joined to an upper end face of the cylinder block 3 via a gasket 4. Four main connecting bolts 6 disposed at four positions around the cylinder bore 3*a* and two auxiliary connecting bolts 7 and 7, which will be described later, are used and for joining, that is, securing the cylinder head 5 to the cylinder block 3.

The crankcase 2 has one open side face; a plurality of steps 8 are formed integrally on an inner peripheral wall slightly close to the inside relative to the open side face, the steps 8 being arranged in the peripheral direction so as to face toward the open side face, and a bearing bracket 10 is secured to these steps 8 via a plurality of bolts 11. This bearing bracket 10 and another side wall of the crankcase 2 support opposite end parts of a horizontally disposed crankshaft 12 via bearings 13 and 13'. Furthermore, opposite end parts of a balancer shaft 14 disposed adjacent to and in parallel with the crankshaft 12 are similarly supported via bearings 15 and 15 by the bearing bracket 10 and said other side wall of the crankcase 2.

Figure 4:
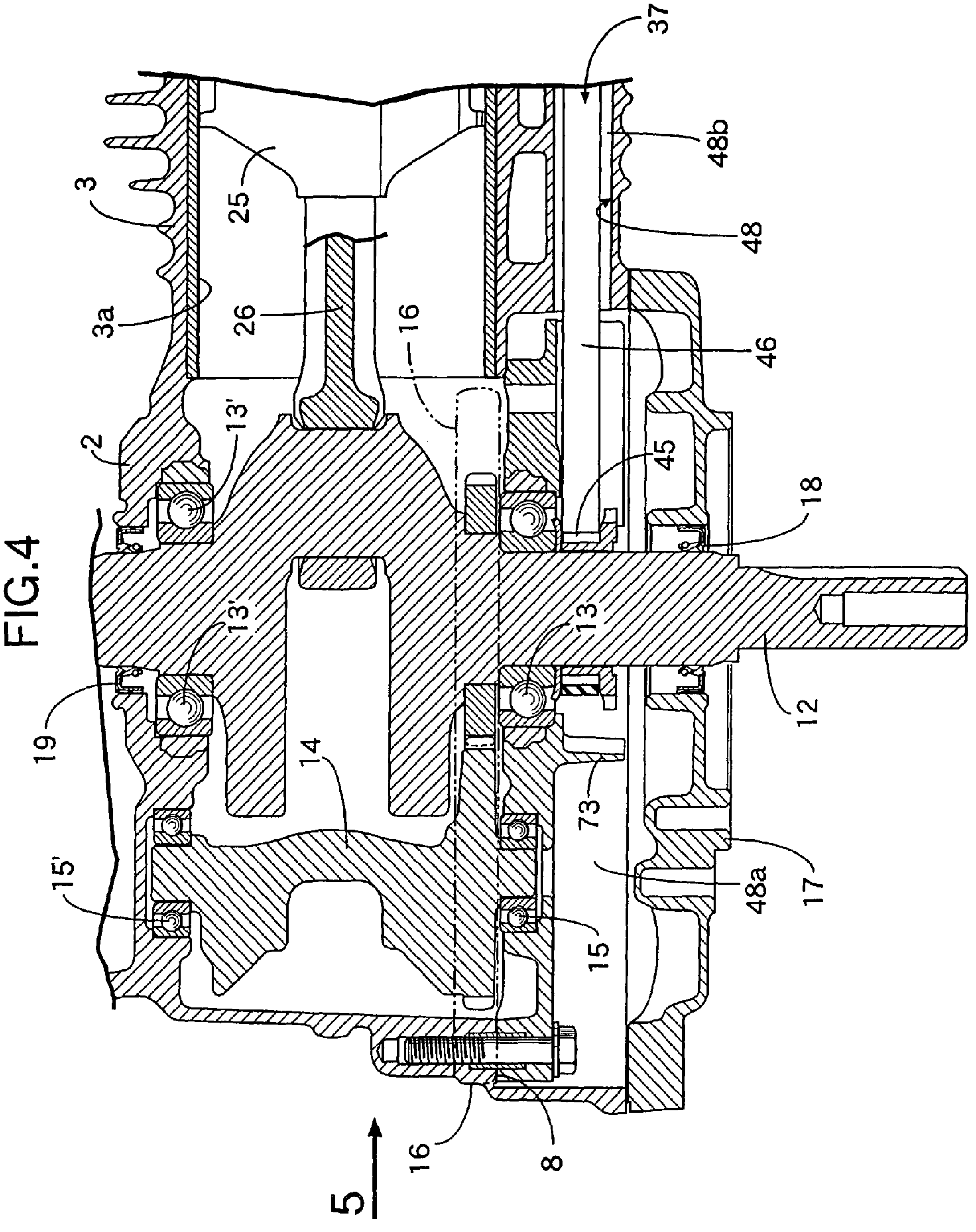
FIG. 4 is an enlarged view of an area around a crankshaft in FIG. 1. (first embodiment)
Figure 5:
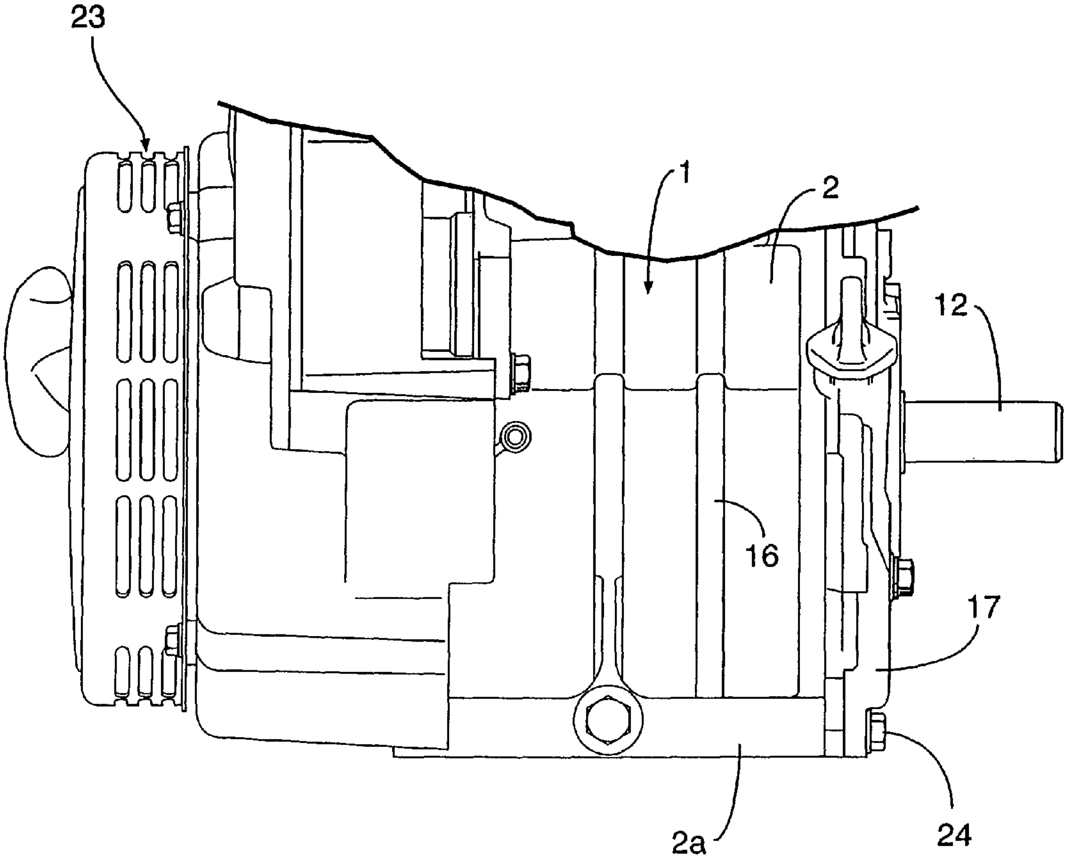
FIG. 5 is a view from arrow 5 in FIG. 4. (first embodiment)

As shown in FIG. 4 and FIG. 5, a continuous reinforcing rib 16 is formed integrally with the outer periphery of the crankcase 2 so as to surround the plurality of steps 8, and an end part of the reinforcing rib 16 is connected integrally to an outside wall of the cylinder block 3, which is integral with the crankcase 2.

Since the reinforcing rib 16 provides, on the outer periphery of the crankcase 2, mutual connection between the plurality of steps 8, which are inside the reinforcing rib 16, the rigidity with which the bearing bracket 10 is supported by these steps 8 and, consequently, the rigidity with which the crankshaft 12 is supported by the bearing bracket 10, can be increased effectively. As a result, the crankcase 2 can be made thin and light. In particular, since an end part of the reinforcing rib 16 is connected integrally to the outside wall of the cylinder block 3, the reinforcing function of the reinforcing rib 16 can be enhanced, thus further increasing the rigidity with which the bearing bracket 10 is supported.

A side cover 17 is joined to the crankcase 2 via a plurality of bolts 24 to close the open face on said one side of the crankcase 2. One end part of the crankshaft 12 runs through the side cover 17 and projects outward as an output shaft part, and an oil seal 18 is mounted on the side cover 17 to be in intimate contact with the outer periphery of the output shaft part.

Referring again to FIG. 1, the other end part of the crankshaft 12 runs through said other side wall of the crankcase 2, and an oil seal 19 is mounted on said other side wall of the crankcase 2 to be in intimate contact with said other end part of the crankshaft 12 so as to be adjacent to the outside of the bearing 13'. A flywheel 21, which also functions as a rotor of a generator 20, is secured to said other end part of the crankshaft 12, and a cooling fan 22 is attached to an outside face of the flywheel 21. Furthermore, a recoil-type starter 23, which is supported on the crankcase 2, is disposed so as to face said other end part of the crankshaft 12.

Figure 3:
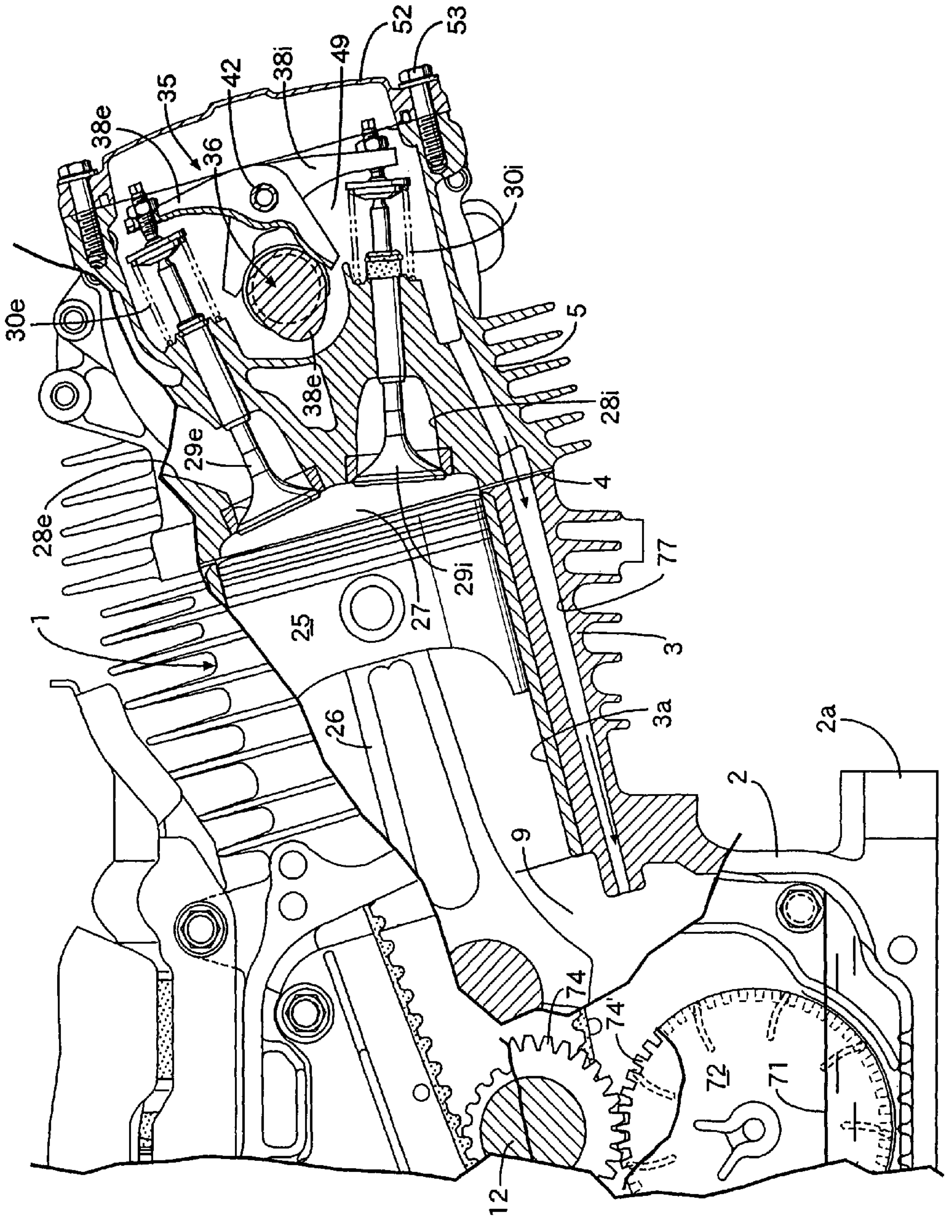
FIG. 3 is a sectional view along line 3-3 in FIG. 1. (first embodiment)

In FIG. 1 and FIG. 3, a piston 25 fitted into the cylinder bore 3*a* is connected to the crankshaft 12 via a connecting rod 26. A combustion chamber 27 communicating with the cylinder bore 3*a*, and an intake port 28*i* and an exhaust port 28*e* each opening in the combustion chamber 27 are formed in the cylinder head 5. An intake valve 29*i* and an exhaust valve 29*e* are mounted in the cylinder head 5 for opening and closing the ends of the intake and exhaust ports 28*i* and 28*e* respectively that open to the combustion chamber 27. Valve springs 30*i* and 30*e* are fitted onto the intake and exhaust valves 29*i* and 29*e* to urge these valves 29*i* and 29*e* in a direction in which they close. The intake and exhaust valves 29*i* and 29*e* are opened and closed by a valve operating system 35 operating in cooperation with these valve springs 30*i* and 30*e*.

The valve operating system 35 is described by reference to FIG. 3, FIG. 4, and FIG. 6 to FIG. 12.

Figure 6:
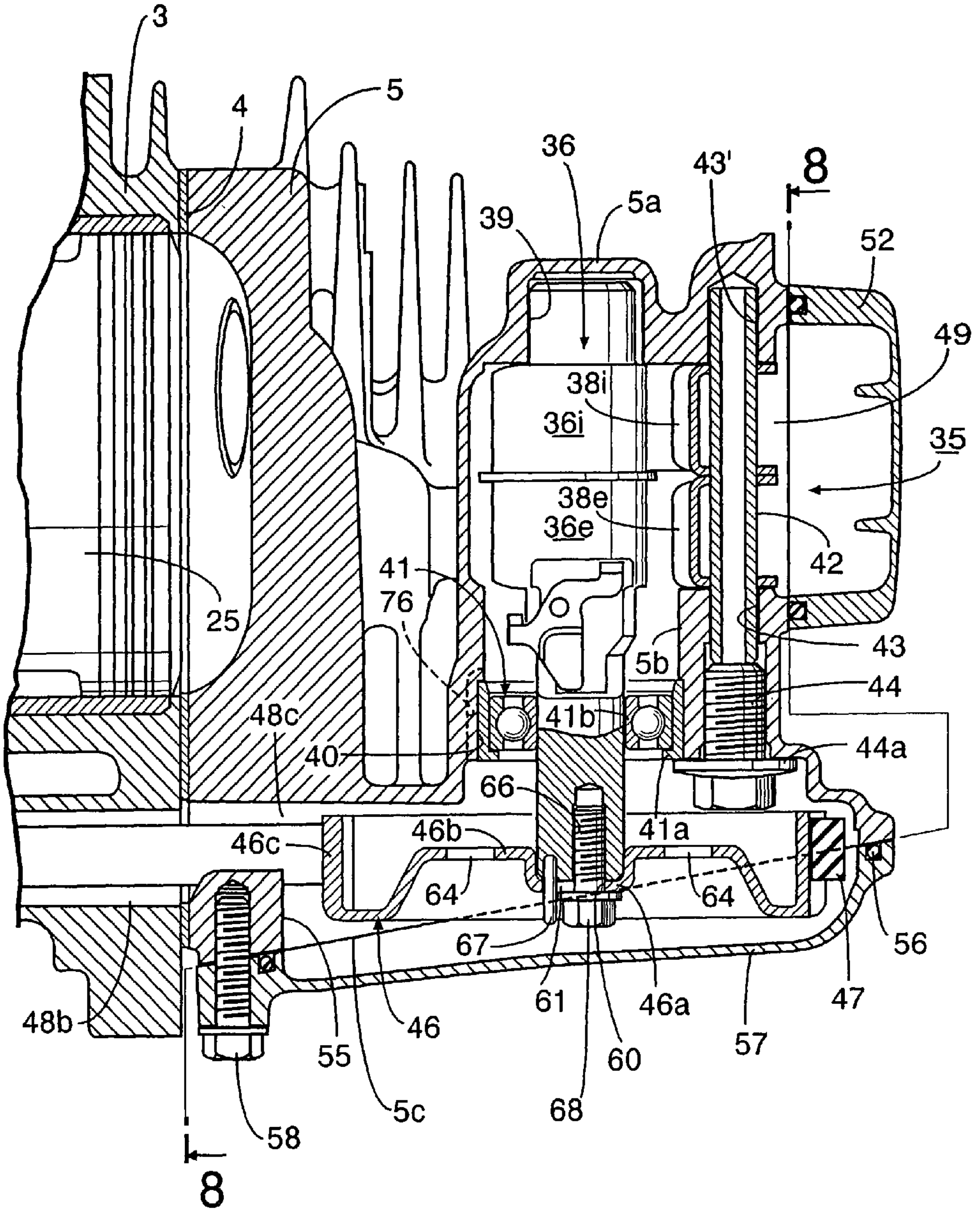
FIG. 6 is a sectional view along line 6-6 in FIG. 2. (first embodiment)

Referring first to FIG. 3, FIG. 4, and FIG. 6, the valve operating system 35 comprises a camshaft 36, a timing transmission system 37, an intake rocker arm 38*i*, and an exhaust rocker arm 38*e*. The camshaft 36 is supported on the cylinder head 5 so as to be parallel to the crankshaft 12, and includes an intake cam 36*i* and an exhaust cam 36*e*. The timing transmission system 37 provides a connection between the crankshaft 12 and the camshaft 36. The intake rocker arm 38*i* provides an operative connection between the intake cam 36*i* and the intake valve 29*i*. The exhaust rocker arm 38*e* provides an operative connection between the exhaust cam 36*e* and the exhaust valve 29*e*.

The camshaft 36 has opposite end parts supported by a pouch-shaped bearing hole 39 and a ball bearing 41, the bearing hole 39 being formed in one side wall 5*a* of the cylinder head 5, and the ball bearing 41 being fitted into a bearing fitting hole 40 of a dividing wall 5*b* in a middle section of the cylinder head 5. One common rocker shaft 42 swingably supporting the intake and exhaust rocker arms 38*i* and 38*e* has opposite end parts supported by first and second support holes 43' and 43 formed in said one side wall 5*a* and the dividing wall 5*b*, respectively. The first support hole 43' of said one side wall 5*a* is pouch-shaped, and the second support 43 of the dividing wall 5*b* is a through hole. A fixing bolt 44 having its extremity abutting against the outer end of the rocker shaft 42 is screwed into the dividing wall 5*b* at an outer end part of the second support hole 43. The rocker shaft 42 is thus prevented from moving in a thrust direction by the pouch-shaped first support hole 43' and the fixing bolt 44.

The fixing bolt 44 has on its head part an integral flange seat 44*a* having a relatively large diameter, the flange seat 44*a* abutting against an outer end face of an outer race 41*a* of the ball bearing 41 supporting the camshaft 36.

An inner race 41*b* of the ball bearing 41 is press-fitted onto the camshaft 36. Thus, when the flange seat 44*a* of the fixing bolt 44 abuts against the outer end of the outer race 41*a* as described above, the camshaft 36 is prevented from moving in a thrust direction by the pouch-shaped bearing hole 39 and the flange seat 44*a*.

Therefore, it is possible to prevent movement in the thrust direction for both the rocker shaft 42 and the camshaft 36 by means of one fixing bolt 44, thus reducing the number of components of the valve operating system 35, simplifying the structure thereof, contributing to making it compact, and contributing to an improvement in the assemblability of the system 35.

The timing transmission system 37 comprises a toothed drive pulley 45 secured to the crankshaft 12, a toothed driven pulley 46 secured to the camshaft 36, and an endless timing belt 47 wound around the drive and driven pulleys 45 and 46, the number of teeth of the driven pulley 46 being twice of that of the drive pulley 45. Rotation of the crankshaft 12 is therefore reduced by ½ by this timing transmission system 37, and transmitted to the camshaft 36. Due to rotation of the camshaft 36, the intake and exhaust cams 36*i* and 36*e* make the intake and exhaust rocker arms 38*i* and 38*e* swing against the urging forces of the valve springs 30*i* and 30*e* respectively, thereby opening and closing the intake and exhaust valves 29*i* and 29*e*.

This timing transmission system 37 is housed in a timing transmission chamber 48 formed by connecting in sequence a lower chamber 48*a*, a middle chamber 48*b*, and an upper chamber 48*c*, the lower chamber 48*a* being defined between the bearing bracket 10 and the side cover 17, the middle chamber 48*b* being formed in the cylinder block 3 on one side of the cylinder bore 3*a*, and the upper chamber 48*c* being formed on one side of the cylinder head 5. That is, the drive pulley 45 is disposed in the lower chamber 48*a*, the driven pulley 46 is disposed in the upper chamber 48*c*, and the timing belt 47 is disposed so as to run through the middle chamber 48*b*. In this way, the space between the bearing bracket 10 and the side cover 17 is utilized effectively for arranging the timing transmission system 37, thereby making the engine E compact.

A valve operating chamber 49 having an open upper face is formed in the cylinder head 5 between said one side wall 5*a* and the dividing wall 5*b*, and the intake and exhaust cams 36*i* and 36*e* of the camshaft 36 and the intake and exhaust rocker arms 38*i* and 38*e*, etc. are housed in the valve operating chamber 49. The open upper face of the valve operating chamber 49 is closed by a head cover 52 joined to the cylinder head 5 via a bolt 53.

The upper chamber 48*c* of the timing transmission chamber 48 and the valve operating chamber 49 communicate with each other via an oil passage hole 75 (see FIG. 8 and FIG. 11) provided in the dividing wall 5*b* and a plurality of oil passage channels 76 (see FIG. 6 and FIG. 11) provided on an inner peripheral face of the bearing fitting hole 40.

In FIG. 6 to FIG. 9, an access window 55 is provided on an outer end face 5*c* of the cylinder head 5, the access window 55 opening the upper chamber 48*c* so that the outer side face of the driven pulley 46 faces the access window 55. The access window 55 is used for inserting the driven pulley 46 within the timing belt 47, and mounting the driven pulley 46 on the camshaft 36. A lid body 57 closing the access window 55 is joined to the outer end face 5*c* via a seal 56 by means of a plurality of bolts 58.

As clearly shown in FIG. 6, the outer end face 5*c* of the cylinder head 5, to which the lid body 57 is joined, comprises an inclined face 5*c* that is inclined so that at least part of the outer periphery of the driven pulley 46 on the side opposite to the drive pulley 45 is exposed through the access window 55, and preferably at least half the periphery of the driven pulley 46 on the side opposite to the drive pulley 45 is exposed through the access window 55.

The structure with which the driven pulley 46 is mounted on the camshaft 36 is now described.

As shown in FIG. 6, the driven pulley 46 comprises a bottomed cylindrical hub 46*a*, a web 46*b* that widens radially from the hub 46*a*, and a toothed rim 46*c* formed on the outer periphery of the web 46*b*. The hub 46*a* is fitted onto the outer periphery of an outer end part of the camshaft 36 projecting toward the upper chamber 48*c* side. An end wall of the hub 46*a* is provided with a bolt hole 60 positioned eccentrically to the center of the hub 46*a*, and a positioning groove 61 extending from one side of the bolt hole 60 to the side exactly opposite to the direction of the eccentricity. Furthermore, a first match mark 62*a* is cut into an outer side face of the rim 46*c*, and a second match mark 62*b* corresponding to the first match mark 62*a* is cut into the outer end face 5*c* of the cylinder head 5. Moreover, the web 46*b* is provided with a plurality of through holes 64, 64 that penetrate it.

Figure 11:
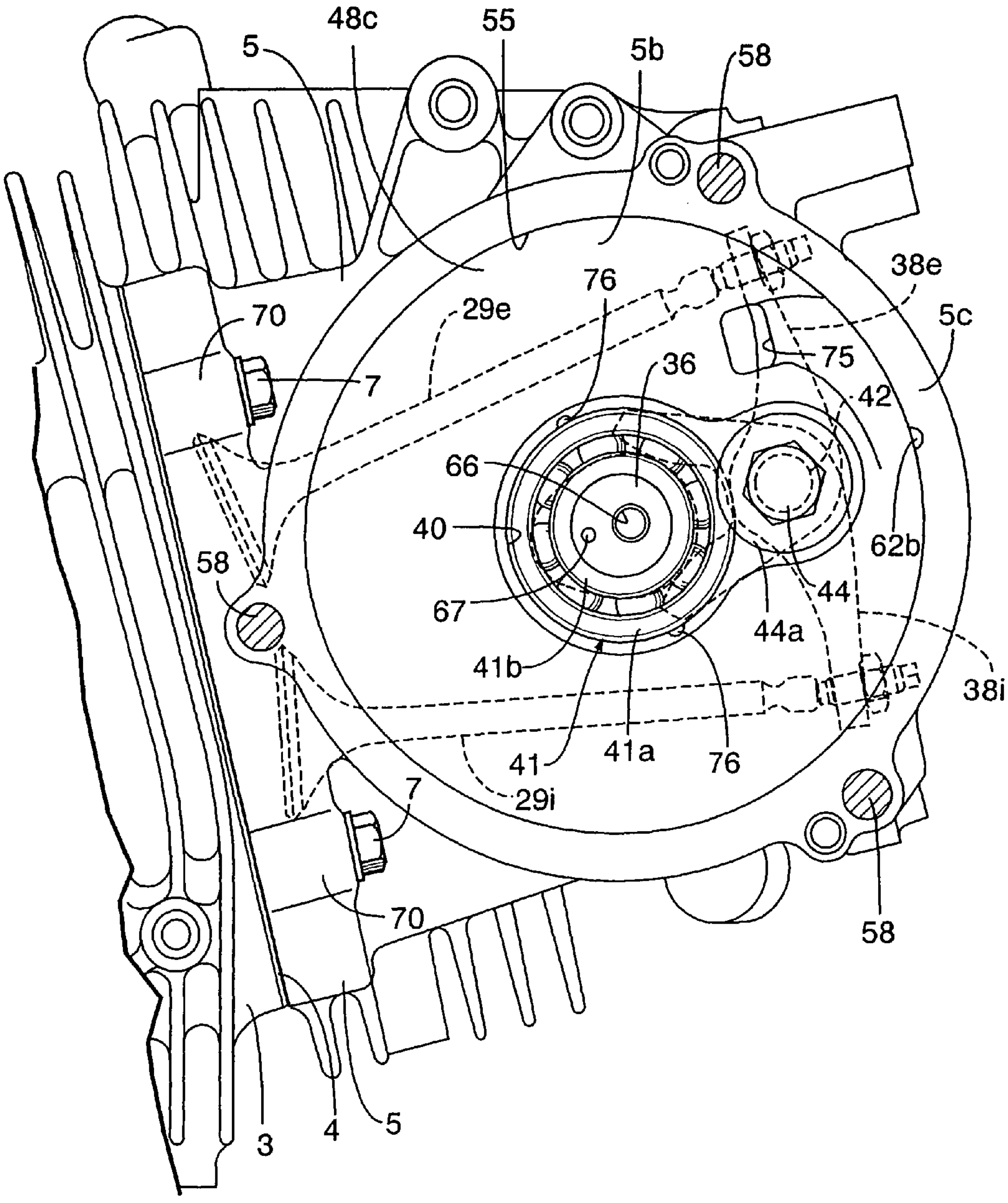
FIG. 11 is a view, corresponding to FIG. 10, in a state in which a driven pulley is removed. (first embodiment)
Figure 12:
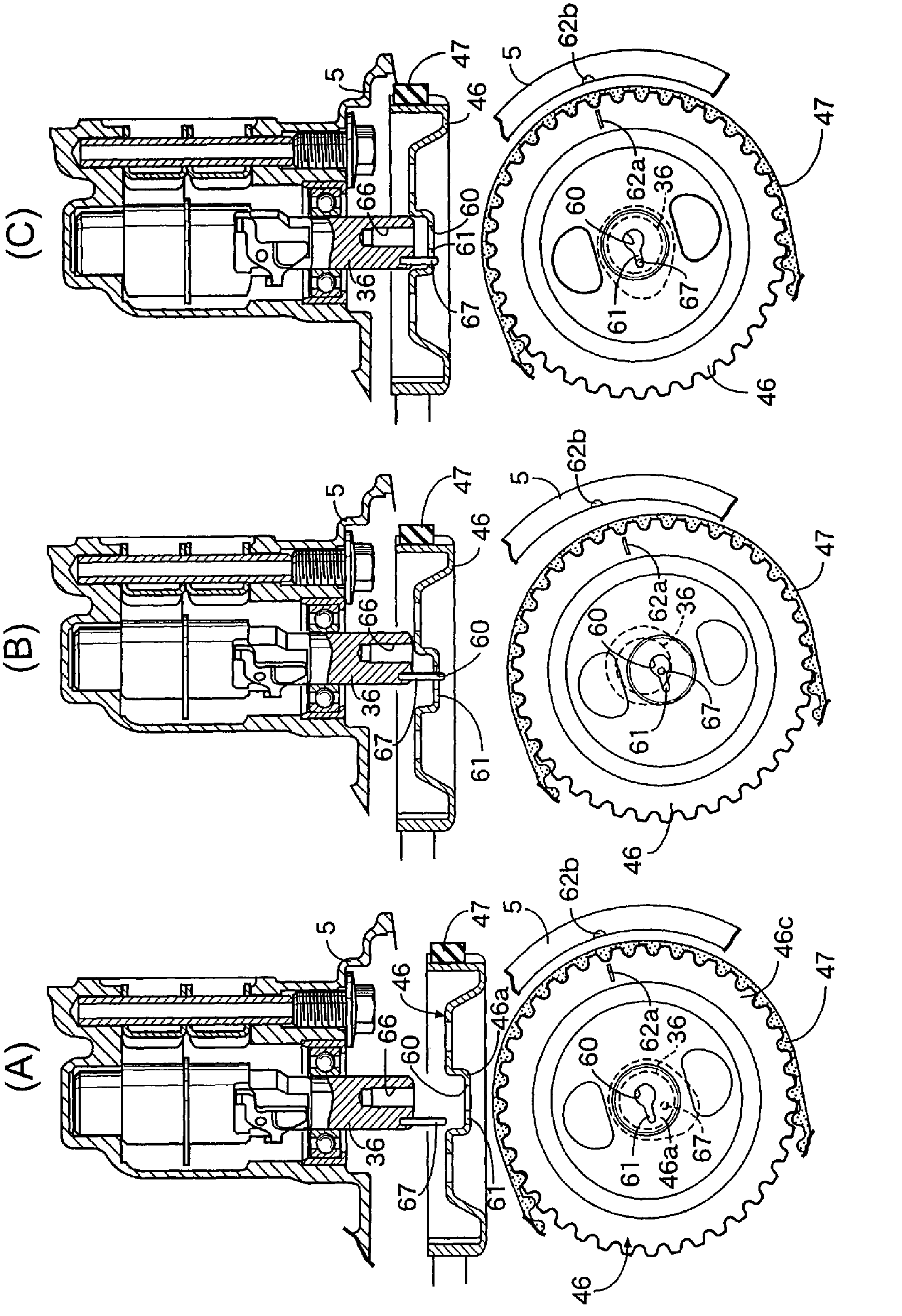
FIG. 12 are views for describing a procedure of mounting the driven pulley on a camshaft. (first embodiment)

The outer end part of the camshaft 36 is provided, as shown in FIG. 6 and FIG. 11, with a threaded hole 66 corresponding to the bolt hole 60 and a positioning pin 67 corresponding to the positioning groove 61.

When the crankshaft 12 is at a predetermined rotational position corresponding to a specified position (for example, top dead center) of the piston 25, and the camshaft 36 is at a position in a predetermined phase relationship with respect to the crankshaft 12, the first match mark 62*a* and the second match mark 62*b*, the bolt hole 60 and the threaded hole 66, and the positioning groove 61 and the positioning pin 67 each coincide with each other on a straight line L running through the centers of the two shafts 12 and 36.

When the driven pulley 46 is mounted on the camshaft 36, the crankshaft 12 is first fixed at the rotational position corresponding to the specified position of the piston 25. Subsequently, as shown in FIG. 12(A), the driven pulley 46 is put inside the timing belt 47, which has been wound around the drive pulley 45 in advance, while making the first match mark 62*a* of the rim 46*c* match the second match mark 62*b* of the cylinder head 5. Next, as shown in FIG. 12(B), when the driven pulley 46 is moved together with the timing belt 47 so that the bolt hole 60 of the driven pulley 46 receives the positioning pin 67 of the camshaft 36 and the positioning pin 67 is then guided into the positioning groove 61, the camshaft 36 rotates in response thereto; and when the positioning pin 67 reaches the extremity of the positioning groove 61, as shown in FIG. 12(C), the bolt hole 60 and the threaded hole 66 match each other at the same time as the camshaft 36 and the hub 46*a* are coaxially aligned.

In this way, by the remarkably simple operation of guiding the positioning pin 67 received by the bolt hole 60 to the positioning groove 61, the first and second match marks 62*a* and 62*b*, the bolt hole 60 and the threaded hole 66, and the positioning groove 61 and the positioning pin 67 are all aligned on the straight line L running through the centers of the crankshaft 12 and the camshaft 36. By visually checking this state, it can easily be confirmed that the crankshaft 12 and the camshaft 36 are in the predetermined phase relationship.

As shown in FIG. 6, screwing and tightening the mounting bolt 68 into the threaded hole 66 through the bolt hole 60 enables the hub 46*a* to be fixed to the camshaft 36. In this way, the timing transmission system 37 is mounted on the crankshaft 12 and the camshaft 36, which are mounted on the crankcase 2 and the cylinder head 5 in advance, in the predetermined phase relationship.

In this case, since the bolt hole 60 and the threaded hole 66 are positioned eccentrically to the centers of the hub 46*a* and the camshaft 36 respectively, rotation of the driven pulley 46 can be transmitted reliably to the camshaft 36 via one eccentric mounting bolt 68, and it is also possible to prevent the mounting bolt 68 from loosening.

Furthermore, since the threaded hole 66 and the positioning pin 67 are positioned eccentrically, in mutually opposite directions, to the center of the camshaft 36, a sufficient degree of eccentricity can be given to each of the bolt hole 60 and the positioning groove 61, which are formed in a narrow end wall of the hub 46*a* of the driven pulley 46, thereby enhancing the positioning effect of the positioning groove 61 relative to the positioning pin and the torque capacity of the mounting bolt 68.

As described above, since the outer end face of the cylinder head 5 on which the access window 55 opens is the inclined face 5*c*, and part of the outer periphery of the driven pulley 46 is exposed through the access window 55, the part of the driven pulley 46 exposed outside the access window 55 can easily be held by a tool, etc. without interference by the cylinder head 5, thereby facilitating the mounting of the driven pulley 46 on the camshaft 36 and the removal thereof. Therefore, this contributes to an improvement in the assemblability and the ease of maintenance.

A side wall 73 of the lid body 57 joined to the outer end face 5*c* of the cylinder head 5, that is, the inclined face 5*c*, is formed so as to be inclined along the inclined face 5*c*. With this arrangement, a head part of the engine main body 1 is shaped such that its lateral width narrows toward the extremity side, thus making the engine E compact.

Figure 7:
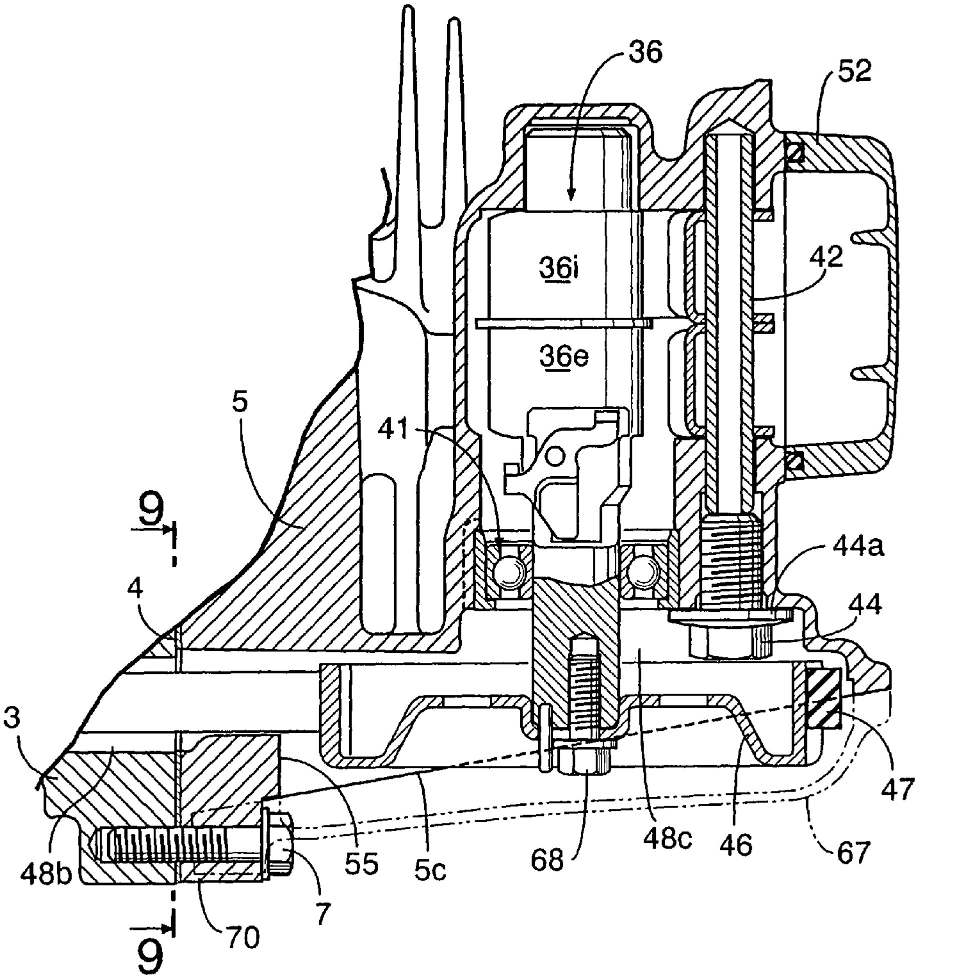
FIG. 7 is a sectional view along line 7-7 in FIG. 2. (first embodiment)
Figure 8:
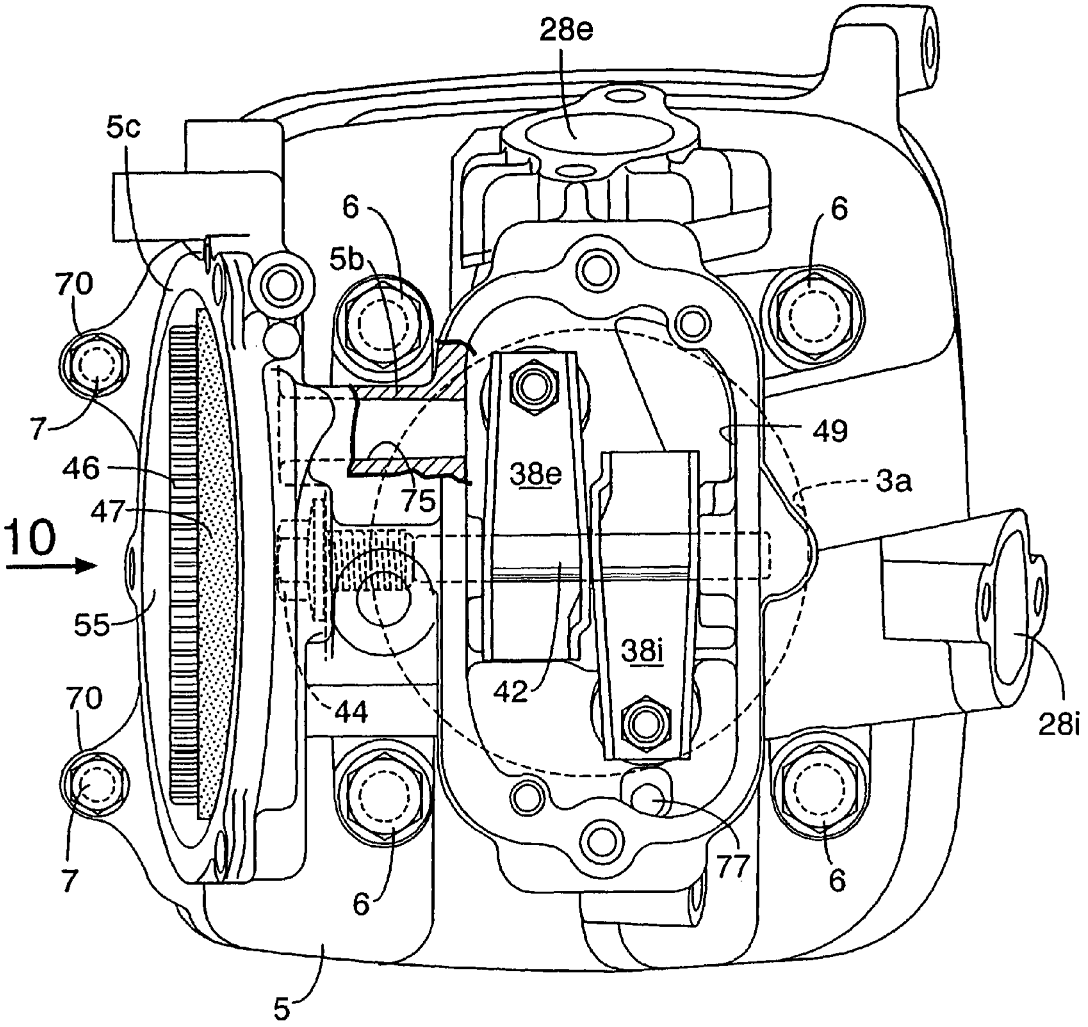
FIG. 8 is a sectional view along line 8-8 in FIG. 6. (first embodiment)
Figure 9:
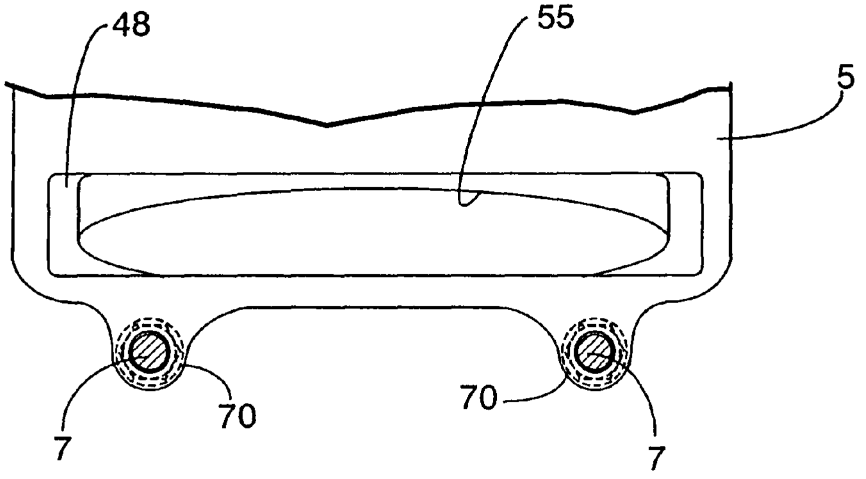
FIG. 9 is a sectional view along line 9-9 in FIG. 7. (first embodiment)
Figure 10:
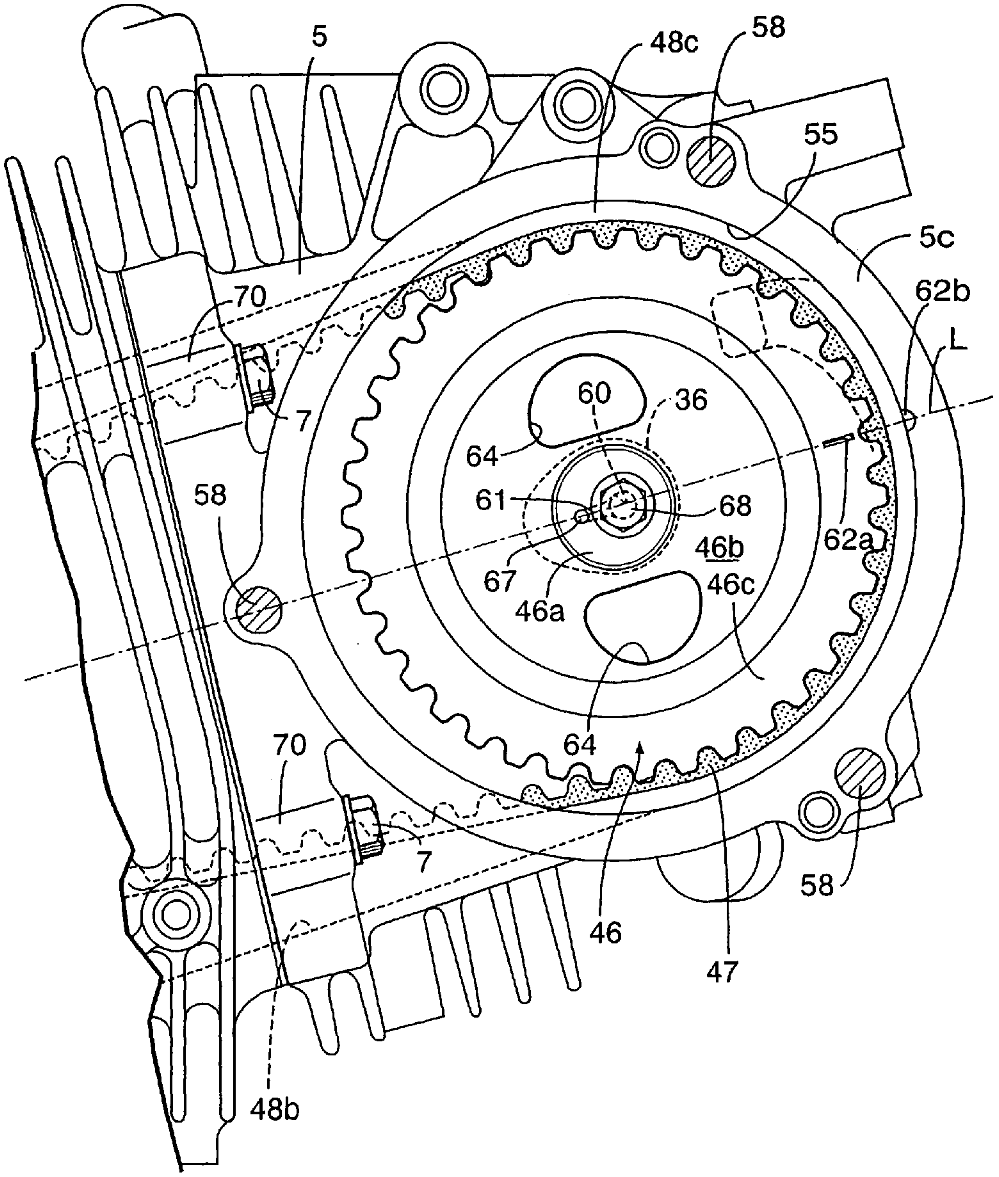
FIG. 10 is a view from arrow 10 in FIG. 8. (first embodiment)

As shown in FIG. 7 to FIG. 9, a pair of projecting parts 70 and 70 projecting outwardly of the access window 55 beneath the access window 55 are formed on the cylinder head 5; these projecting parts 70 and 70 are superimposed on an upper end face, on the outside of the middle chamber 48*b*, of the cylinder block 3 via the gasket 4, and secured to the cylinder block 3 via the auxiliary connecting bolts 7 and 7.

In accordance with such securing by the auxiliary connecting bolts 7 and 7, it is possible to adequately increase the surface pressure acting on the gasket 4 from the cylinder block 3 and the cylinder head 5 even outside the middle chamber 48*b* housing the timing belt 47. Moreover, since the presence of the inclined face 5*c* secures a sufficient space above the auxiliary connecting bolts 7 and 7, for receiving a tool for operating the auxiliary connecting bolts 7 and 7, tightening of the auxiliary connecting bolts 7 and 7 can easily be carried out. This means that the extent to which the projecting parts 70 and 70 project outwardly of the access window 55 can be made small, and this also contributes to making the engine E compact.

Tightening the auxiliary connecting bolts 7 and 7 is carried out prior to the lid body 57 being mounted.

Lubrication of the valve operating system 35 is now described.

In FIG. 1 to FIG. 3, FIG. 6, and FIG. 8, the lower chamber 48*a* of the timing transmission chamber 48 communicates with the interior of the crankcase 2, that is, the crank chamber 9, through the plurality of steps 8 on the inner wall of the crankcase 2 supporting the bearing bracket 10, and a predetermined amount of lubricating oil 71 that is common to the crank chamber 9 and the lower chamber 48*a* accumulates in these chambers.

As shown in FIG. 3, an impeller type oil slinger 72 is disposed in the lower chamber 48*a* so that part of the oil slinger 72 is submerged in the oil 71 that accumulates in the lower chamber 48*a*. The oil slinger 72 is driven by the crankshaft 12 via gears 74 and 74'. This oil slinger 72 scatters the oil 71 around by its rotation, and an oil guide wall 73 for guiding the scattered oil to the timing belt 47, side is formed integrally with an outer side face of the bearing bracket 10 so as to surround the oil slinger 72 and the periphery of the timing belt 47 on the drive pulley 45 side. Since the bearing bracket 10 is a relatively small component, this can easily be cast together with the oil guide wall 73. Further, since the bearing bracket 10 integrally has the oil guide wall 73, its rigidity is strengthened and this is also effective in enhancing the rigidity with which the crankshaft 12 is supported.

In the lower chamber 48*a*, oil scattered by the oil slinger 72 is guided by the oil guide wall 73 to the timing belt 47 side; the oil that has been deposited on the timing belt 47 is transferred to the upper chamber 48*c* by the belt 47; scattered around by being shaken off due to centrifugal force when the timing belt 47 becomes wound around the driven pulley 46; and made to collide with the surrounding wall to thus form an oil mist; and the upper chamber 48*c* is filled with this oil mist, thereby lubricating not only the entire timing transmission system 37 but also the ball bearing 41 of the camshaft 36.

In particular, in the upper chamber 48*c*, when part of the oil shaken off the timing belt 47 collides with the inclined inner face of the lid body 57, it bounces off toward the web 46*b* of the driven pulley 46. This oil passes through the through holes 64 and 64 of the driven pulley 46, and is scattered over the ball bearing 41, thus lubricating the ball bearing 41. Part of the oil scattered over the ball bearing 41 moves to the valve operating chamber 49 through the oil passage channel 76 on the outer periphery of the bearing 41, and the ball bearing 41 is therefore lubricated also from the valve operating chamber 49 side. Lubrication of the ball bearing 41 is thus carried out very well.

As shown in FIG. 3, a base part of the valve operating chamber 49 communicates with the crank chamber 9 via a series of oil return passages 77 formed in the cylinder head 5 and the cylinder block 3 along one side of the cylinder bore 3*a*. The oil return passage 77 is inclined downward toward the crank chamber 9 so that oil flows down from the valve operating chamber 49 to the crank chamber 9.

While the engine E is running, pressure pulsations occur in the crank chamber accompanying the rise and fall of the piston 25, and when the pressure pulsations are transmitted to the valve operating chamber 49 and the timing transmission chamber 48 through the oil return passage 77, the oil passage hole 75 and the oil passage channel 76, oil mist moves to and fro between the valve operating chamber 49 and the timing transmission chamber 48, thereby effectively lubricating the entire valve operating system 35.

After lubrication, oil that has collected in the valve operating chamber 49 flows down the oil return passage 77 and returns to the crank chamber 9. Furthermore, since the base face of the timing transmission chamber 48 is inclined downward toward the lower chamber 48*a*, oil that has collected in the upper chamber 48*c* flows down the middle chamber 48*b* and returns to the lower chamber 48*a*.

In this way, by utilizing the operation of the oil slinger 72 and the timing transmission system 37 and the pressure pulsations of the crank chamber 9, the interiors of the timing transmission chamber 48 and the valve operating chamber 49, which are separated from each other, can be lubricated with oil mist. Therefore, it is unnecessary to employ an oil pump exclusively used for lubrication, whereby structure of the engine E can be simplified and made compact, and the cost can be reduced. Further, it is possible to maintain the arrangement in which the camshaft 36 is disposed above the intake and exhaust valves 29*i* and 29*e*, thereby ensuring a desired output performance for the engine.

The present invention is not limited to the above-mentioned embodiment, and may be modified in a variety of ways as long as the modifications do not depart from the spirit and scope thereof. For example, the belt type timing transmission system 37 may be replaced with a chain type.

The invention claimed is:

1. An engine comprising:

a crankshaft supported on a crankcase;

a valve-operating camshaft supported on a cylinder head;

a rocker shaft disposed adjacent to and parallel with the camshaft, wherein the camshaft is disposed between the crankshaft and rocker shaft and the rocker shaft swingably supports an intake rocker arm and an exhaust rocker arm and has opposing ends directly supported by first and second support holes defined in opposing walls of the cylinder head;

a timing transmission system which includes a drive rotation member fixedly mounted to the crankshaft, a driven rotation member fixedly mounted to the camshaft, and an endless power transmission member wound around the two rotation members, and which provides connection between the crankshaft and the valve-operating camshaft;

an access window through which the driven rotation member is attached to and detached from the camshaft being opened in an outer end surface of the cylinder head, and a lid body for closing the access window being jointed to the outer end surface of the cylinder head, a first match mark indicated on an outer side surface of the driven rotation member;

a second match mark indicated on an engine main body to coincide with the first match mark when the crankshaft is in a predetermined rotational position;

a bolt hole provided in an end wall of a hub of the driven rotation member which is fitted into an end portion of the camshaft;

a positioning groove extending radially from the bolt hole;

a positioning pin projectingly provided on an end surface of the camshaft in a position eccentric from a center of the end surface in a certain direction, and engaged with the positioning groove when the camshaft is in a predetermined phase relationship to the crankshaft in the predetermined rotational position;

a threaded hole which is provided on the end surface of the camshaft and corresponds to the bolt hole when the camshaft is in a predetermined phase relationship to the crankshaft in the predetermined rotational position; and a mounting bolt penetrating through the bolt hole and screwed into the threaded hole to fix the hub to the camshaft;

wherein the outer end surface of the cylinder head comprises a slanted surface which is inclined so that at least a part of an outer periphery of the driven rotation member on a side opposite from the drive rotation member is exposed from the access window.

2. The engine according to claim 1, wherein the slanted surface is formed so that a half-round portion or more of the driven rotation member on the side opposite from the drive rotation member is exposed from the access window.

3. The engine according to claim 1, wherein the cylinder head is superposed, via a gasket, on a cylinder block which is connected to the crankcase and which includes a cylinder bore and a timing transmission chamber that is present on one side of the cylinder bore and houses the timing transmission system; the cylinder head is fastened to the cylinder block by a plurality of main connecting bolts arranged around the cylinder bore; and the cylinder head is fastened to the cylinder block at a portion outward of one side of the timing transmission chamber by an auxiliary connecting bolt disposed below the access window.

4. The engine according to claim 1, wherein a side wall of the lid body is inclined along the slanted surface of the cylinder head.

5. The engine according to claim 1, wherein when the camshaft is in the predetermined phase relationship to the crankshaft in the predetermined rotational position, the first and second match marks, the positioning groove and the positioning pin are arranged on a straight line (L) passing through centers of the crankshaft and the camshaft.

6. The engine according to claim 5, wherein the bolt hole and the threaded hole are arranged in positions eccentric from centers of the hub and the camshaft, respectively.

7. The engine according to claim 6, wherein the threaded hole and the positioning pin are arranged in positions which are eccentric from the center of the camshaft in directions opposite from each other.

8. The engine according to claim 2, wherein the cylinder head is superposed, via a gasket, on a cylinder block which is connected to the crankcase and which includes a cylinder bore and a timing transmission chamber that is present on one side of the cylinder bore and houses the timing transmission system; the cylinder head is fastened to the cylinder block by a plurality of main connecting bolts arranged around the cylinder bore; and the cylinder head is fastened to the cylinder block at a portion outward of one side of the timing transmission chamber by an auxiliary connecting bolt disposed below the access window.

9. The engine according to claim 2, wherein a side wall of the lid body is inclined along the slanted surface of the cylinder head.

10. The engine according to claim 1, wherein when the camshaft is in the predetermined phase relationship to the crankshaft in the predetermined rotational position, the first and second match marks, the positioning groove and the positioning pin are arranged on a straight line (L) passing through centers of the crankshaft and the camshaft.

11. The engine according to claim 2, wherein when the camshaft is in the predetermined phase relationship to the crankshaft in the predetermined rotational position, the first and second match marks, the positioning groove and the positioning pin are arranged on a straight line (L) passing through centers of the crankshaft and the camshaft.

12. The engine according to claim 3, wherein when the camshaft is in the predetermined phase relationship to the crankshaft in the predetermined rotational position, the first and second match marks, the positioning groove and the positioning pin are arranged on a straight line (L) passing through centers of the crankshaft and the camshaft.

13. The engine according to claim 4, wherein when the camshaft is in the predetermined phase relationship to the crankshaft in the predetermined rotational position, the first and second match marks, the positioning groove and the positioning pin are arranged on a straight line (L) passing through centers of the crankshaft and the camshaft.

14. The engine according to claim 1, wherein the rocker shaft is positioned closer to the valve-operating camshaft in a radial direction relative to a longitudinal axis of the valve-operating camshaft than an outer circumference of the driven rotation member.

* * * * *